June 17, 1930.    G. A. DALTON ET AL    1,765,209
FLEXIBLE COUPLING PIN
Filed Dec. 29, 1926
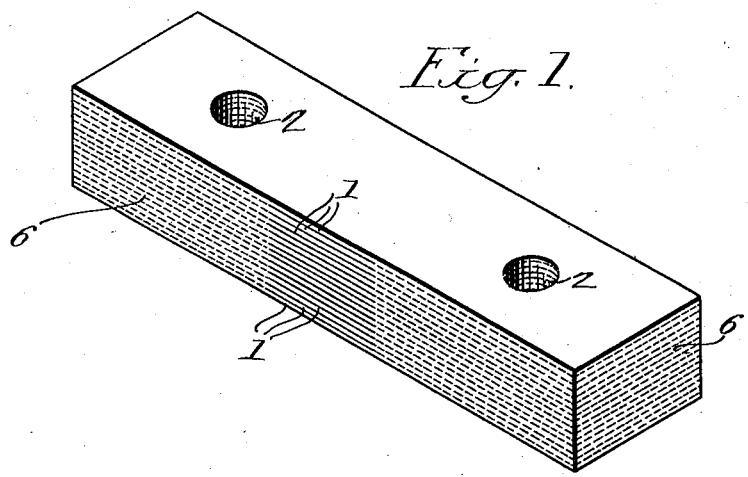
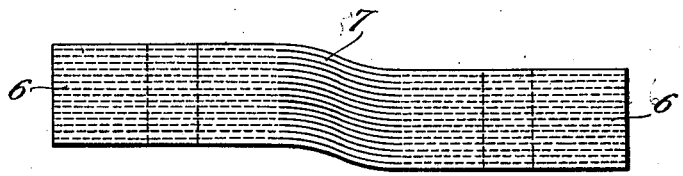
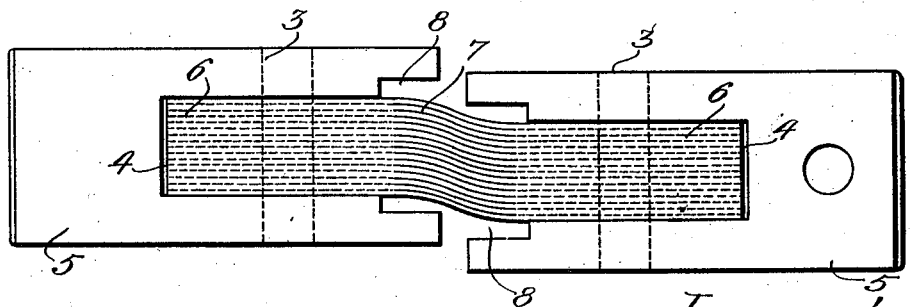
Inventors
George A. Dalton,
John R. Dunham,
by their Attorneys,
Howson & Howson Patented June 17, 1930

1,765,209

UNITED STATES PATENT OFFICE

GEORGE A. DALTON AND JOHN R. DUNHAM, OF HIGHLAND PARK, NEW JERSEY, ASSIGNORS TO JOHN WALDRON CORPORATION, OF NEW BRUNSWICK, NEW JERSEY, A CORPORATION OF NEW JERSEY

FLEXIBLE COUPLING PIN

Application filed December 29, 1926. Serial No. 157,786.

This invention relates to improvements in flexible couplings, and relates more particularly to improvements in flexible coupling pins of a well known type forming a part of a certain class of coupling.

The principal object of the invention is to provide an improved form of coupling pin including a flexible element and keepers for the ends of said element, in which strains and stresses between the flexible element and the keepers are reduced to a minimum.

More specifically, the invention contemplates the provision of a novel form of flexible element which when flexed under load has not the same tendency as the present form of flexible element to change position relative to the recesses which the ends thereof occupy in the respective keepers, and to this end, the invention contemplates the provision of a flexible coupling element which when deflected still has a tendency to maintain the parallelism of the deflected extremities.

Another object of the invention is to provide a novel form of keeper which tends generally to reduce the wear developing between the keeper and the flexible pin element.

In the attached drawings:

Figure 1 is a view in perspective of a flexible element made in accordance with the present invention;

Fig. 2 is a side elevation of the element with its ends deflected, and

Fig. 3 is a side view of the pin assembly including the flexible element and the keepers.

It is customary to form the flexible elements of coupling pins of a plurality of thin flexible strips of steel laid together as shown in Fig. 1, the strips being designated in said figure by the reference numeral 1. This laminated flexible element is commonly perforated at each end, as indicated at 2 in Fig. 1, for the reception of pins 3, shown in broken lines in Fig. 3, which secure the ends of the flexible element in slots 4 provided for their reception in cylindrical or other suitably shaped keeper elements 5. The flexible element with the keepers constitutes a well known form of coupling pin which will be readily recognized by those familiar with the art.

We have discovered that when in a flexible element such as described above the strips which constitute the laminæ are rigidly secured together at the extremities so that the said strips cannot slide on each other longitudinally, there is a natural tendency when the element is deflected as shown in Fig. 2 for the offset extremities to retain a normal parallelism, as clearly illustrated in Figs. 2 and 3. Although other methods may be employed for securing the ends of the strips together, we have had success in practice by welding the strips together at the ends as indicated in the drawings, in which the welded end portions are designated by the reference numeral 6, while the intermediate portion 7 is unwelded so that the laminæ retain their individuality.

It will be noted from Fig. 3, that the recesses 4 in the keepers, in which the ends of the flexible elements are lodged, are less in depth than the lengths of the welded sections 6 of the flexible elements so that all flexure of the pin occurs in the portion thereof unembraced by the recesses. Under these conditions, and with the tendency of the solid end sections to remain parallel, corner pressure at the outer edges of the slots 4 is practically eliminated. It will also be noted that the keepers are cut back at their inner ends, as indicated at 8, so that the effective element-receiving slots 4 are set back from the inner or adjacent ends of the keepers. This arrangement makes possible a coupling pin of a predetermined overall length with a flexible element of the general type described above in which the intermediate unbound laminated portion 7 is of the maximum desirable length and in which the effective bearing surfaces of the keepers 5 is also maintained at a desired maximum.

The practical advantage of the aforedescribed device resides largely in the elimination of the tendency of the ends of the flexible element to cock in the recesses or holes in the keepers, and the elimination of corner pressure between the flexible element and the keepers at the outer edges of the keeper-receiving slots. Under these conditions, it will be apparent that whatever wear takes place between the flexible element and the keepers will be evenly distributed over the entire contacting area of one or both sides of the flexible element and the effective life of the device correspondingly increased. Obviously also these benefits extend to the keepers in their relations to the coupling elements in which they are mounted.

We claim:

1. As a new article of manufacture, a flexible element consisting of a series of flat flexible steel strips laid together and welded in the end sections, the strips in the intermediate section being free to move with respect to each other.

2. As a new article of manufacture, a pin for use with flexible couplings comprising a flexible laminated element having an intermediate section in which the said laminæ are relatively free, and having end sections in which the laminæ are united to prevent relative movement, and keepers for the ends of said element, the means for uniting the laminæ in the end sections being independent of said keepers.

3. As a new article of manufacture, a flexible coupling pin comprising a flexible laminated element, keepers for the ends of said element, means for securing the ends of the element to the keepers, and other means for preventing relative movement of the laminæ of said element in the end sections of the latter.

GEORGE A. DALTON.
JOHN R. DUNHAM.